Figure 1:
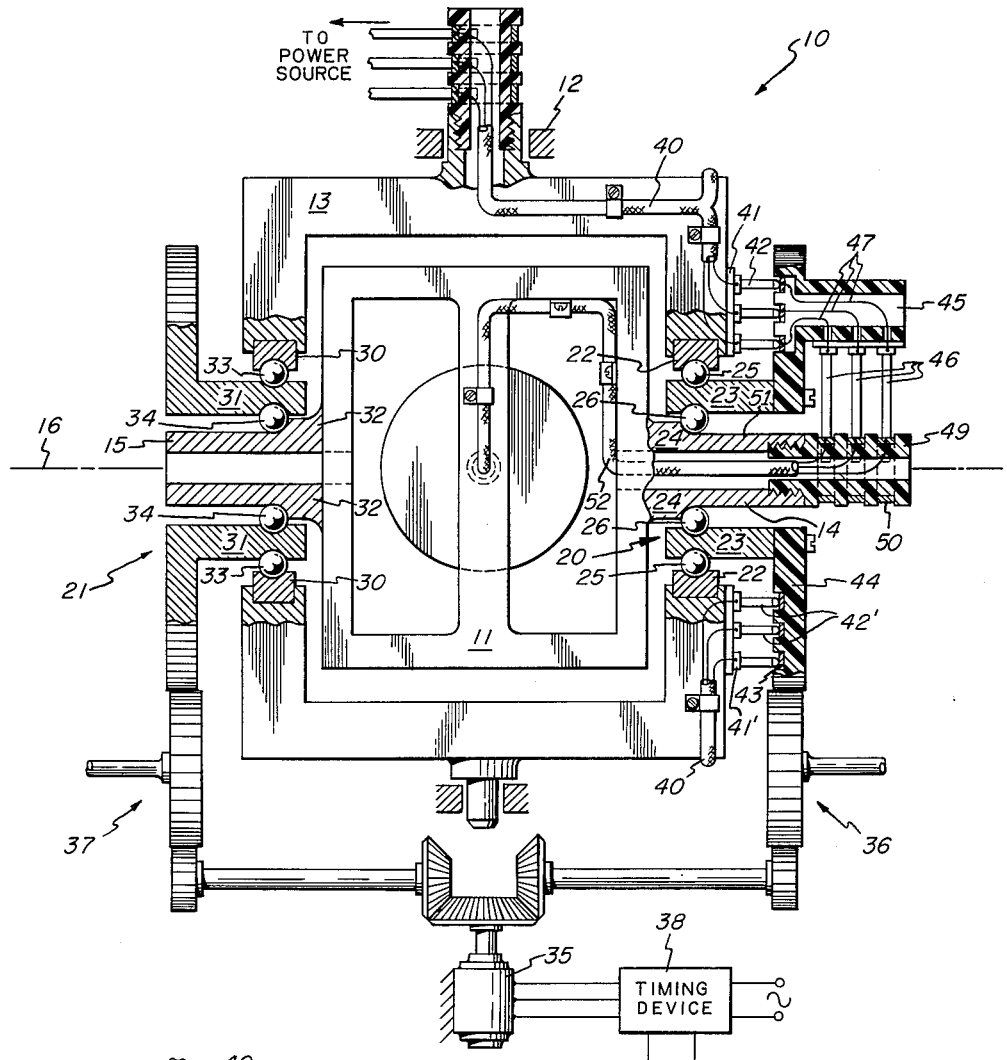

INVENTORS
RICHARD E. SWARTS
BERT V. TIBLIN
BY

ATTORNEY

United States Patent Office 3,216,262
Patented Nov. 9, 1965

3,216,262
ANTI-FRICTION ELECTRICAL POWER
TRANSMISSION APPARATUS
Richard E. Swarts, Northport, and Bert V. Tiblin, Huntington, N.Y., assignors to Sperry Rand Corporation, Great Neck, N.Y., a corporation of Delaware
Filed Oct. 18, 1962, Ser. No. 231,424
5 Claims. (Cl. 74—5)

The present invention relates to minimizing the frictional effects caused by apparatus for conducting electrical power between elements that experience relative rotary motion with respect to each other.

The present invention is particularly applicable to improving the accuracy of gyroscopic instruments. The accuracy of a gyroscopic instrument is usually defined as a certain level of drift rate or random wander of the gyro spin axis in inertial space. In extremely high accuracy devices, particularly gyroscopic apparatus, there is an increasing demand for higher accuracy instruments. One of the problems in developing higher accuracy gyroscopic instruments is that of transmitting electrical power to energize the motor which spins the gyroscopic rotor without introducing torques on the gyro sensitive element which increase the drift rate.

A number of methods have previously been used to conduct electrical power across rotating axes which are sensitive to small variations in the torque imposed on the axes, for example, the axes associated with the gimbals of a gyroscope. The prior art apparatus includes the use of flexible wires, axial pivots and contacts, as well as slip rings and brushes. All of the prior art devices introduce undesirable torques which result in increasing the drift rate of the gyroscope.

A primary object of the present invention therefore is to provide apparatus for conducting electrical power between relatively movable parts with a minimum of frictional effects.

It is an additional object of the present invention to provide apparatus for conducting electrical power across rotating axes of a gyroscopic instrument which appreciably improves the accuracy of said instrument.

It is a further object of the present invention to provide apparatus for conducting electrical power across rotating axes in which the frictional effects caused thereby are averaged to a minimum.

The above objects are accomplished, for example, in a gyroscope by conducting the electrical power from an outer gimbal ring to an intermediate rotatable member journaled between the outer gimbal ring and an inner gimbal ring and thence conducting the power from the intermediate member to the inner gimbal ring. By imparting rotary motion to the intermediate member not only is dynamic friction substituted for static friction but the undesirable torque applied by the electrical power conducting apparatus is averaged to a minimum value.

Figure 2:
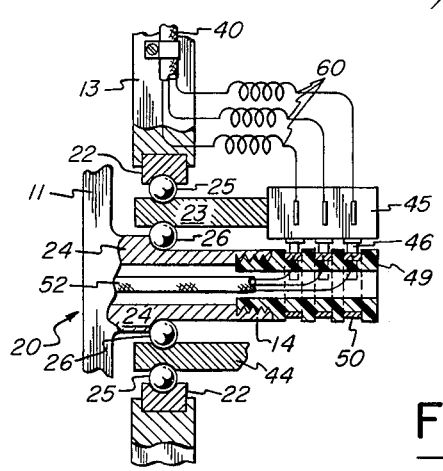

Referring to the drawings,

FIG. 1 is a section view of a two degree of freedom gyroscope embodying the present invention, and FIG. 2 is a sectional view of a gimbal bearing trunnion assembly of a two degree of freedom gyroscope showing an alternative embodiment of the present invention.

Although the invention will be described as applied to a gyroscopic instrument, it will be appreciated that it is equally applicable to conducting electrical power across rotating axes generally to minimize undesirable frictional effects.

Referring to FIG. 1, a two degree of freedom gyroscope 10 includes an inner gimbal or rotor case 11 known as the sensitive element whose rotor (shown in dotted lines) is spun about an axis perpendicular to the plane of the paper by electrical motor means well known in the art. The rotor case 11 is universally supported within a housing schematically shown at 12 by means of an outer gimbal 13. The trunnions 14 and 15 of the rotor case 11 are journalled about an axis 16 to the gimbal 13 by diametrically opposed composite rotatable bearings 20 and 21 respectively. The bearings 20 and 21 are of the type disclosed in U.S. Patent 2,970,480, issued February 7, 1961 to E. L. Ziegler et al., entitled Anti-friction Support Mechanism for Gyroscopic Devices. The composite bearing 20 comprises an outer race 22 associated with the gimbal 13, an intermediate rotatable member or race 23, and an inner race 24 associated with the trunnion 14. Bearing balls 25 are disposed between the outer race 22 and intermediate race 23 while bearing balls 26 are disposed between the intermediate race 23 and the inner race 24. Similarly, the composite bearing 21 comprises an outer race 30, an intermediate race 31 and an inner race 32 as well as bearing balls 33 separating the outer race 30 and the intermediate race 31, and bearing balls 34 separating the intermediate race 31 and the inner race 32.

Preferably, the intermediate or middle races 23 and 31 are rotatable through several revolutions in each direction and each middle race is rotated in a direction opposite to its diametrically opposed middle race. Further, the direction of rotation of each middle race is periodically and simultaneously reversed for improving the accuracy of the gyroscopic instrument 10 as more fully explained in the aforementioned U.S. Patent 2,970,480. A suitable mechanism for accomplishing this result may be an electric motor 35 which drives the intermediate races 23 and 31 through respective gear trains 36 and 37. The direction of rotation of the motor 35 may be periodically reversed by means of an electrical timing device 38 or any other suitable means as more fully described in said U.S. Patent 2,970,480. The electrical timing device 38 may be a multivibrator, for example, that periodically reverses the polarity of the potential to the motor 35 thereby reversing the direction of rotation thereof periodically. Alternatively, a mechanical switching device of the type disclosed in said U.S. Patent 2,970,480 may be used to periodically reverse the polarity of the potential on the motor 35.

In order to transmit electrical power from the outer gimbal 13 to the rotor motor within the rotor case 11, cascaded slip ring and brush combinations are used. Electrical leads 40 carrying power from a power source not shown are mounted on the outer gimbal 13 and they are connected by means of a brush block 41 to respective brushes 42. The brush block 41 is mounted on the outer gimbal 13 to hold the brushes 42 against their associated slip rings 43. The slip rings 43 are secured to a radial flanged extension 44 of the intermediate race 23 in order that the brushes 42 exert a force against their respective slip rings 43 in a direction parallel to the axis 16. In a similar manner, additional power leads 40 are mounted on the lower portion of the outer gimbal 13 as viewed in the drawing and connect through a brush block 41' to respective brushes 42' which cooperate with their respective slip rings 43. In this manner, the pressure exerted by the brushes 42 and 42' on their respective slip rings 43 can be quite large since the resultant forces produce no undesirable torques.

Another brush block 45 extends in a direction parallel to the axis 16 from the extension 44 of the intermediate race 23. The brush block 45 holds brushes 46 which are connected to respective slip rings 43 by means of leads 47. The brushes 46 bear lightly on respective slip rings 50 which are mounted upon a cylindrical slip ring support member 49 that in turn is partially inserted within a hollow cylindrical extension 51 of the journal 14. The slip rings 50 are concentric with the axis 16. The slip rings 50 are connected to respective leads 52 which protrude through the trunnion 14 to provide electrical power to the gyro motor within the rotor case 11.

In operation with the intermediate race 23 rotating about the axis 16, the brushes 46 rotate around the slip rings 50 in synchronism with the intermediate race 23. This action not only causes the torque about the axis 16 to be the result of sliding rather than the considerably higher static friction but with the direction of the torque periodically reversed due to the reversal of the intermediate race 23, the undesirable torque applied by the brushes 46 is averaged which results in essentially negligible net torque imposed on the rotor case or sensitive element 11 due to the brush friction. The general theory of reducing frictional effects by averaging the undesirable torques is more fully disclosed in said U.S. Patent 2,970,480.

It will be appreciated that other modifications may be made to provide a more symmetrical apparatus. For example, an equal number of brushes similar to 46 may be mounted to rest upon the diametric opposite portion of the slip rings 50 to thereby balance the forces applied perpendicular to the axis 16. Further symmetry may be achieved by utilizing a mirror image of the cascaded brush and slip ring combination on the opposite side of the rotor case 11 by mounting it to be cooperative with the intermediate race 31, outer gimbal 13, and trunnion 15.

An alternative embodiment of the present invention is shown in FIG. 2 wherein similar elements are indicated by similar reference characters. In the embodiment of FIG. 2, the intermediate race 23 is oscillated over a relatively small angle, i.e., "dithered," for example, through an angle $\pm 5°$ by means not shown. In this embodiment, the leads 40 mounted on the outer gimbal 13 are connected by flexible electrical leads 60 to respective brushes 46 mounted on the brush block 45. The brush block 45 is connected to the intermediate race 23 and as explained previously, the brushes 46 cooperate with respective slip rings 50 mounted on a support member 49 inserted within an extension 51 of the trunnion 14.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:
1. In a gyroscopic apparatus,
 (1) a first gimbal,
 (2) a second gimbal,
 (3) a pair of trunnions carried by said first gimbal,
 (4) a separate rotatable member journalled to each of said trunnions and upon which said second gimbal is journaled,
 (5) drive means drivably connected to said members for simultaneously imparting rotory motion to both of said members in opposite directions,
 (6) reversing means coupled to said drive means for periodically and simultaneously reversing the direction of motion of said members,
 (7) first current transmitting means for transmitting current between said second gimbal and to one of said rotatable members having one portion connected to said second gimbal and another portion connected to said one of said rotatable members,
 (8) and second current transmitting means for transmitting current between said one of said rotatable members and said first gimbal having one portion connected to said one of said rotatable members and another portion connected to said first gimbal.

2. In a gyroscopic apparatus,
 (1) a first gimbal,
 (2) a second gimbal,
 (3) a pair of trunnions carried by said first gimbal,
 (4) a separate rotatable member journalled to each of said trunnnions and upon which said second gimbal is journalled,
 (5) drive means drivably connected to said members for simultaneously imparting rotary motion to both of said members,
 (6) reversing means coupled to said drive means for periodically reversing the direction of motion of said members,
 (7) first brush and slip ring means having first brushes mounted on said second gimbal and cooperative with respective first slip rings mounted on one of said rotatable members for transmitting electrical power from said second gimbal to said one of said rotatable members,
 (8) and second brush and slip ring means having second brushes connected respectively to said first slip rings and mounted on said one of said rotatable members and cooperative with respective slip rings mounted on one of said trunnions for transmitting electrical power from said one of said rotatable members to said first gimbal.

3. Apparatus as recited in claim 2 in which said second brushes are symmetrically disposed to contact said one of said trunnions on diametrically opposite portions thereof.

4. Apparatus as recited in claim 2 in which said first brushes are symmetrically disposed to contact said one of said rotatable members on diametrically opposite portions thereof and said second brushes are symmetrically disposed to contact said one of said trunnions on diametrically opposite portions thereof.

5. In a gyroscopic apparatus,
 (1) a first gimbal,
 (2) a second gimbal,
 (3) a pair of trunnions carried by said first gimbal,
 (4) a separate rotatable member journalled to each of said trunnions and upon which said second gimbal is journalled,
 (5) drive means drivably connected to said members for imparting limited rotary motion to said members,
 (6) means coupled to said drive means for periodically reversing the direction of motion of said members,
 (7) a plurality of flexible electrical leads having one end connected to said second gimbal,
 (8) and brush and slip ring means having brushes connected respectively to said flexible leads and mounted on one of said rotatable members and cooperative with respective slip rings mounted on one of said trunnions for transmitting electrical power from said one of said rotatable members to said first gimbal.

References Cited by the Examiner

UNITED STATES PATENTS

| | | |
|---|---|---|
| 1,143,948 | 6/15 | Dawson et al. |
| 2,970,480 | 2/61 | Ziegler et al. _____ 74—5 |

FOREIGN PATENTS

| | | |
|---|---|---|
| 317,313 | 12/19 | Germany. |

BROUGHTON G. DURHAM, *Primary Examiner.*